(12) United States Patent
Amacker et al.

(10) Patent No.: US 9,785,998 B1
(45) Date of Patent: Oct. 10, 2017

(54) TECHNIQUES FOR PROVIDING EVENT REMINDERS

(71) Applicant: A9.COM, INC., Palo Alto, CA (US)

(72) Inventors: Matthew W. Amacker, Santa Clara, CA (US); Dawn R. Dodd, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 887 days.

(21) Appl. No.: 14/158,625

(22) Filed: Jan. 17, 2014

Related U.S. Application Data

(62) Division of application No. 13/107,775, filed on May 13, 2011, now Pat. No. 8,635,122.

(51) Int. Cl.
*G06Q 30/00* (2012.01)
*G06Q 30/06* (2012.01)

(52) U.S. Cl.
CPC ................ *G06Q 30/0633* (2013.01)

(58) Field of Classification Search
CPC .......................... G06C 30/06–30/08
USPC ............................... 705/26.1–27.2
See application file for complete search history.

(56) References Cited

U.S. PATENT DOCUMENTS

| | | | |
|---|---|---|---|
| 6,611,814 B1 | 8/2003 | Lee et al. | |
| 6,865,546 B1 | 3/2005 | Song | |
| 6,925,444 B1 | 8/2005 | McCollom et al. | |
| 7,756,753 B1 | 7/2010 | McFarland | |
| 8,195,529 B1 | 6/2012 | Cohen | |
| 2005/0091120 A1* | 4/2005 | Auletta | G06Q 10/0637 705/7.36 |
| 2005/0177458 A1 | 8/2005 | Martineau et al. | |
| 2009/0055285 A1 | 2/2009 | Law et al. | |
| 2009/0055291 A1 | 2/2009 | Ho et al. | |
| 2009/0275331 A1* | 11/2009 | Maitreya | H04L 67/04 455/435.1 |
| 2011/0016023 A1 | 1/2011 | Zakas | |

OTHER PUBLICATIONS

"Debenham Launches Android & Nokia Apps for Shoppers on the Move" (anonymous. PR Newwire (New York) Mar. 23, 2011).
U.S. Notice of Allowance dated Sep. 18, 2013 from U.S. Appl. No. 13/107,775.

\* cited by examiner

*Primary Examiner* — Ethan D Civan
(74) *Attorney, Agent, or Firm* — Hogan Lovells US LLP

(57) ABSTRACT

Techniques for updating content created for a third party user are disclosed. In one embodiment, the method for updating content comprises receiving information for an item associated with a third party user, requesting a search including information for a plurality of items offered for purchase, the search request being based on the received information for the at least one item, and updating content for the third party user with one of the items included in the list of items received in response to the search request. Information for the item associated with the third party user may be received from a list of items associated with the third party user and maintained by the third party user or from a content source associated with an entity other than the third party user.

20 Claims, 12 Drawing Sheets

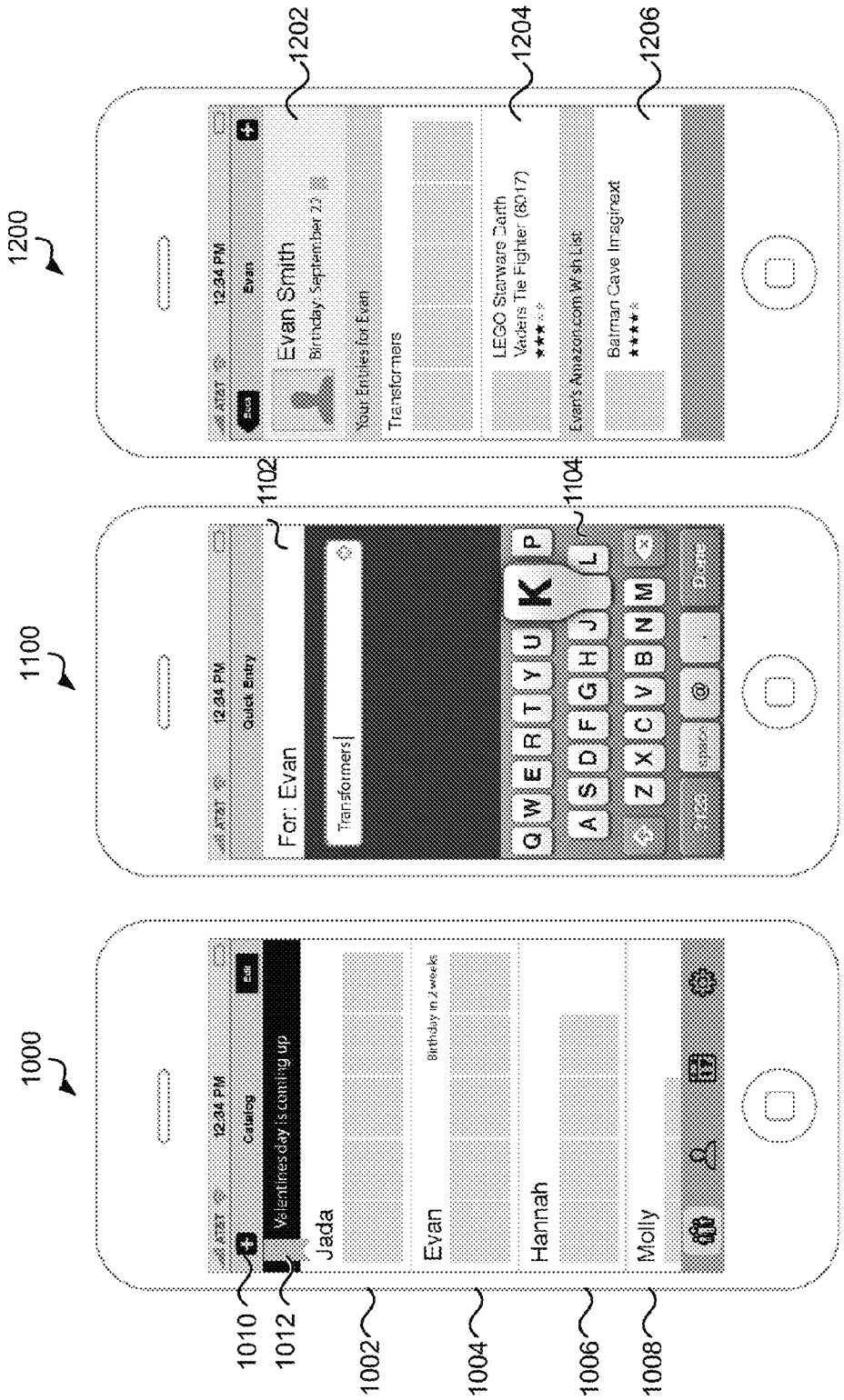

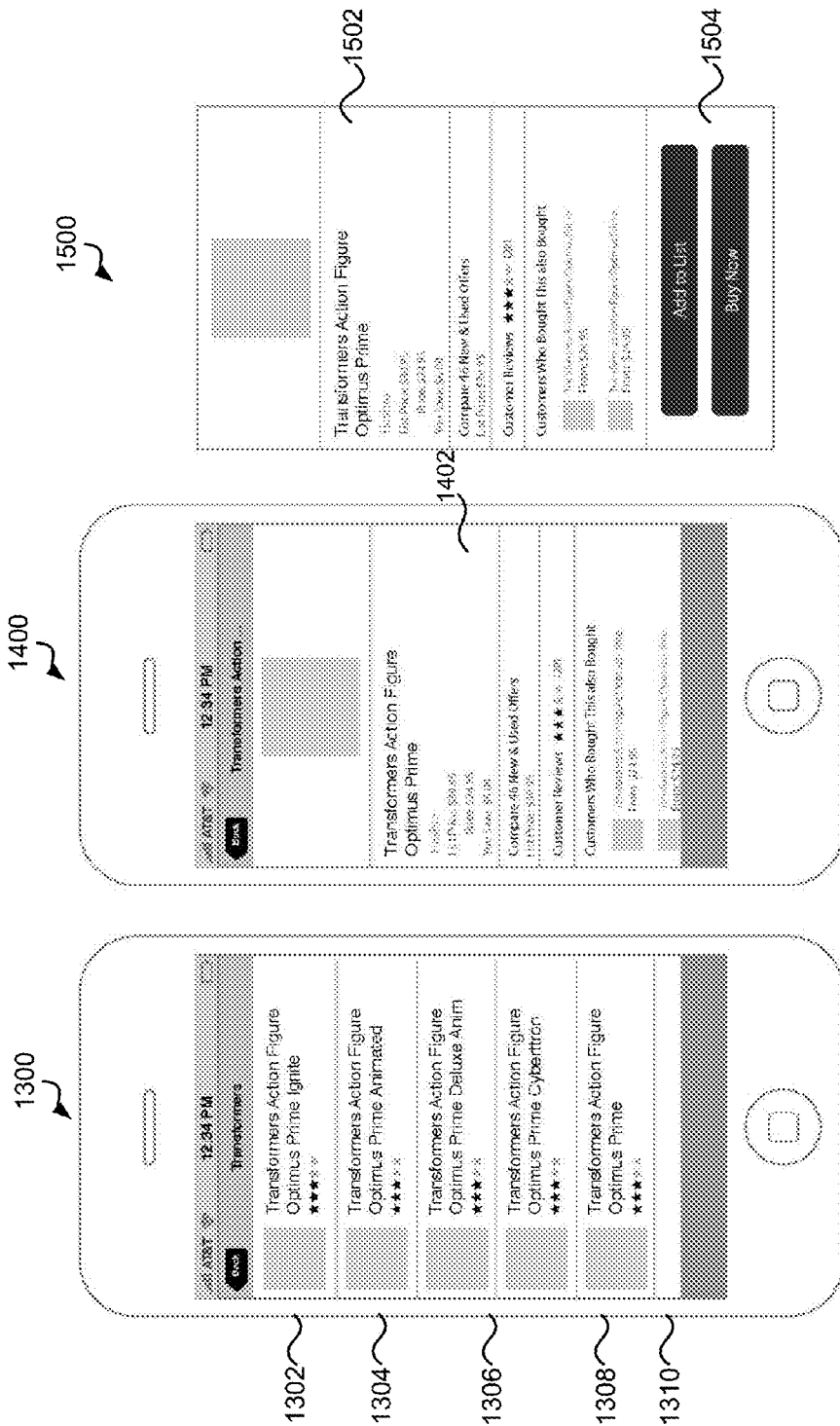

TECHNIQUES FOR PROVIDING EVENT REMINDERS

CROSS REFERENCE TO RELATED APPLICATIONS

This application is a Divisional of, and accordingly claims the benefit of, U.S. patent application Ser. No. 13/107,775, filed with the U.S. Patent and Trademark Office on May 13, 2011, which is hereby incorporated herein by reference.

BACKGROUND

Electronic entities having a presence in an electronic environment, such as may be provided via a Web site or other such source of content, often take advantage of the full capabilities of modern Web-based services to deliver a compelling user experience. For example, an Internet user may access Web sites offering items, products, or services for sale. Frequently, an electronic entity operating such a Web site offers the capability for a user to create a "wishlist." Wishlists typically compile an itemization of goods or services that a user may desire to obtain at some future point in time. The list's author will make his or her list available to family, friends, and other community members who are likely to purchase gifts for the would-be recipient. The goal of a wishlist is to facilitate communication between the gift receiver and the gift giver.

However, these users have a tendency to forget to keep their wishlists up-to-date. Furthermore, it may be burdensome to at least some users to have to periodically modify wishlists because each update of a wishlist typically involves conducting numerous searches to locate and include newly desired items, deleting items that have been obtained or are no longer desired, and the like. As a result, a user's wishlist may be out-of-date or otherwise "stale," and may no longer accurately reflect the current needs or desires of the user.

BRIEF DESCRIPTION OF THE DRAWINGS

FIG. 10 illustrates an example screenshot of a user interface of a system for providing event reminders configured on a wireless device in accordance with an embodiment.

FIG. 11 illustrates another example screenshot of a user interface of a system for providing event reminders configured on a wireless device in accordance with an embodiment.

FIG. 12 illustrates yet another example screenshot of a user interface of a system for providing event reminders configured on a wireless device in accordance with an embodiment.

FIG. 13 illustrates yet another example screenshot of a user interface of a system for providing event reminders configured on a wireless device in accordance with an embodiment.

FIG. 14 illustrates yet another example screenshot of a user interface of a system for providing event reminders configured on a wireless device in accordance with an embodiment.

FIG. 15 illustrates yet another example screenshot of a user interface of a system for providing event reminders configured on a wireless device in accordance with an embodiment.

DETAILED DESCRIPTION

Figure 1:
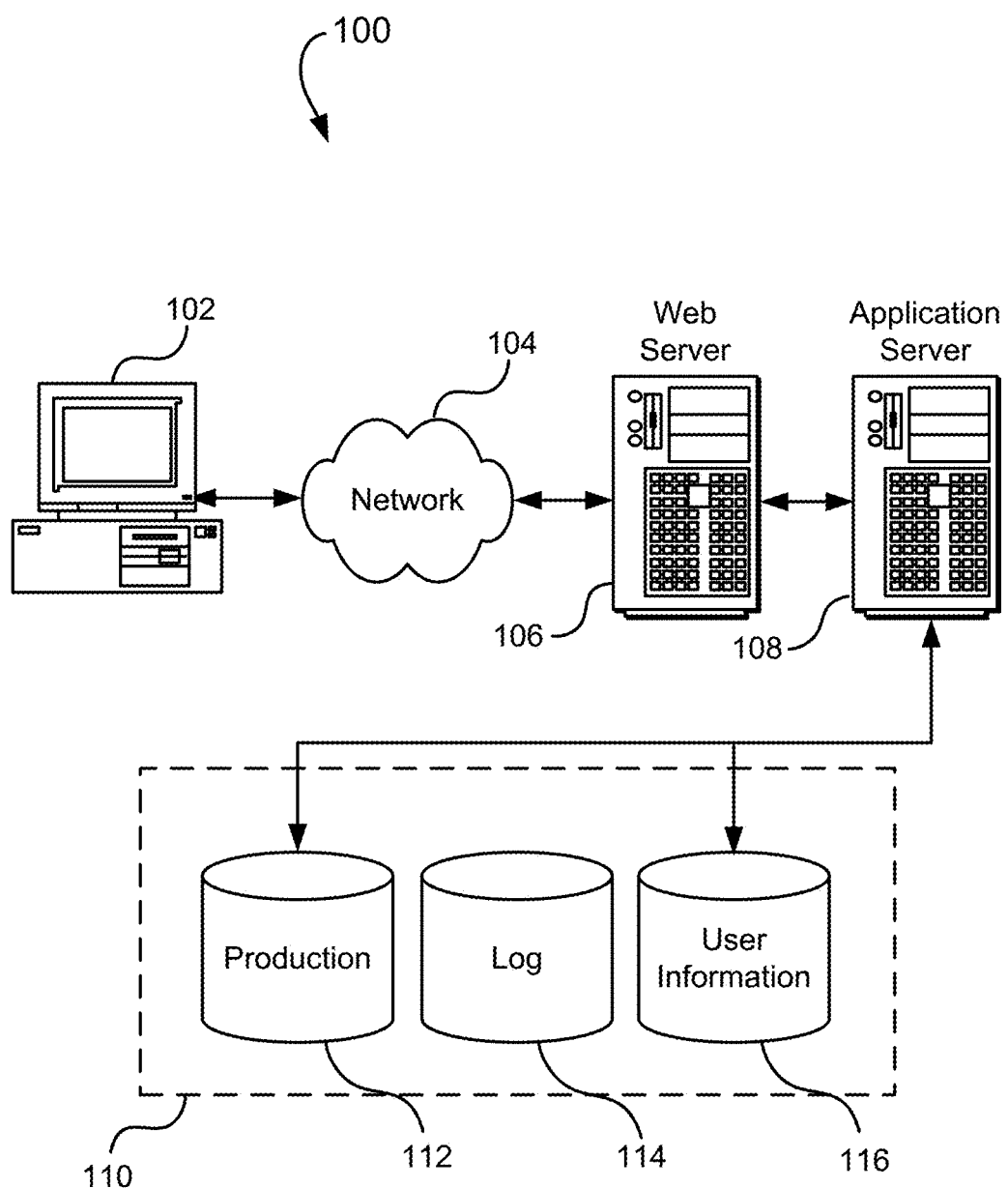
FIG. 1 illustrates an environment in which various embodiments can be implemented.

Techniques are presented for updating a wishlist or similar collection of content, as may be created for a third party based on content relevant to the third party. These techniques can also provide notifications such as third party-related event reminders in accordance with various embodiments. In a network-based environment (e.g., based upon the Internet), a user may conduct a search for any item of interest (e.g., a product, video or audio content, an image, and the like) on a network resource using one or more search services, such as at least one network search engine. A network resource may include a collection of content such as a Web site or electronic marketplace that can be accessed through a client browser or other such interface and displayed on a display element of a computing device. A network resource visited by a user may contain information for one or more items (e.g., products or services) that the user has located, such as through browsing or search. Based on the user's activities with respect to the network and/or network resource, the user may then compile his or her wishlist of desired items and associate the wishlist with one or more network resources. The user may make a wishlist available for viewing and/or updating by other users, for example, through the associated network resource. Users who may access the wishlist may include, for example, members of the user's family, user's friends, or other members of user's community.

In accordance with an embodiment, a member of the user's community (hereinafter a "first party user" or a "user"), such as a brother of the user who created his own wishlist as described above, may create his/her own wishlist for that user (hereinafter a "third party user" or "third party"). A wishlist for the third party user may include items input by the first party user or other users who may be authorized by the first party user to access the first party user's wishlist for the third party. For example, a third party user's spouse may be authorized to access a wishlist for a third party created by the third party's brother.

The wishlist for the third party user may be updated with the items that the third party user included in his/her own wishlist or corresponding items retrieved based on the items included in the third party user's wishlist. As a non-limiting example, a third party user may locate an item in an electronic commerce system and add the item to his/her own wishlist. Information related to the submitted item may be fed into the wishlist for the third party created by the first party user. Based on the item information, a search of the electronic commerce system may be conducted (e.g., based upon the search terms associated with the item and retrieved from the item information) and the search results may be returned to the first party user who then may update his/her wishlist for the third party. The wishlist created for a third party may include alerts on significant dates associated with the third party user (e.g., a third party user's birthday), as well as alerts associated with other holidays (e.g., Christmas, Mother's Day, and the like).

In one embodiment, techniques described herein utilize filtering items to be added to a wishlist for a third party. Filtering techniques may include using different filtering criteria, for example, a first party user's gender, profession, or interests, recency of the modification of the third party's own wishlist that "surfaced" the item to be added, and the like. The filtering criteria may further include, but may not be limited to, attributes associated with nearing significant dates; for example, seasons of the year; religious or cultural affinities, such as Christmas, Easter, Hanukkah, Veteran's Day, and the like; and/or other attributes associated with the significant dates.

The items to be added to a wishlist may be further weighed based upon the above criteria and/or other criteria. For example, an item added by a third party user to his/her own wishlist will weigh more on the wishlist created by another user for the third party than items added by the third party user's friends because the item added by the third party user will be considered more relevant to the third party user's preferences than the items picked by his/her friends or other community members.

Information about the items to be included in a wishlist may include, and derive from, text, images, hyperlinks, barcodes, and the like. Information about the items may include items corresponding or related to an item added to the third party's own wishlist, search results based on search terms derived from the information about the item added to the third party's own wishlist (e.g., a video game platform of the game added by the third party user to his/her wishlist), feeds from the third party's social networking profiles (e.g., feeds related to the third party's updates of his/her page on Facebook®), and the like.

In one embodiment, a wishlist created for a third party may be collaborative. Specifically, individuals other than the first party user who created a wishlist for the third party may be allowed to contribute to the wishlist. A group of individuals who are allowed access to a wishlist may be selected according to the predetermined criteria. In one embodiment, the creator of a wishlist may set up these criteria, for example, an affinity or relation of a user requesting to access a wishlist to the third party (e.g., a relative, a friend, or a co-worker and the like). In another embodiment, the credentials of the requestor may be checked automatically using, for example, requestor's personal information published in a social networking site, such as Facebook®. If the requestor's credentials satisfy the predetermined access criteria, the requestor may be allowed to access the wishlist and add his/her items. In an embodiment, items added by the requestor may be made available for viewing by other users whose profile meets the predetermined access criteria. However, the identity of the requestor may be concealed from other users.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
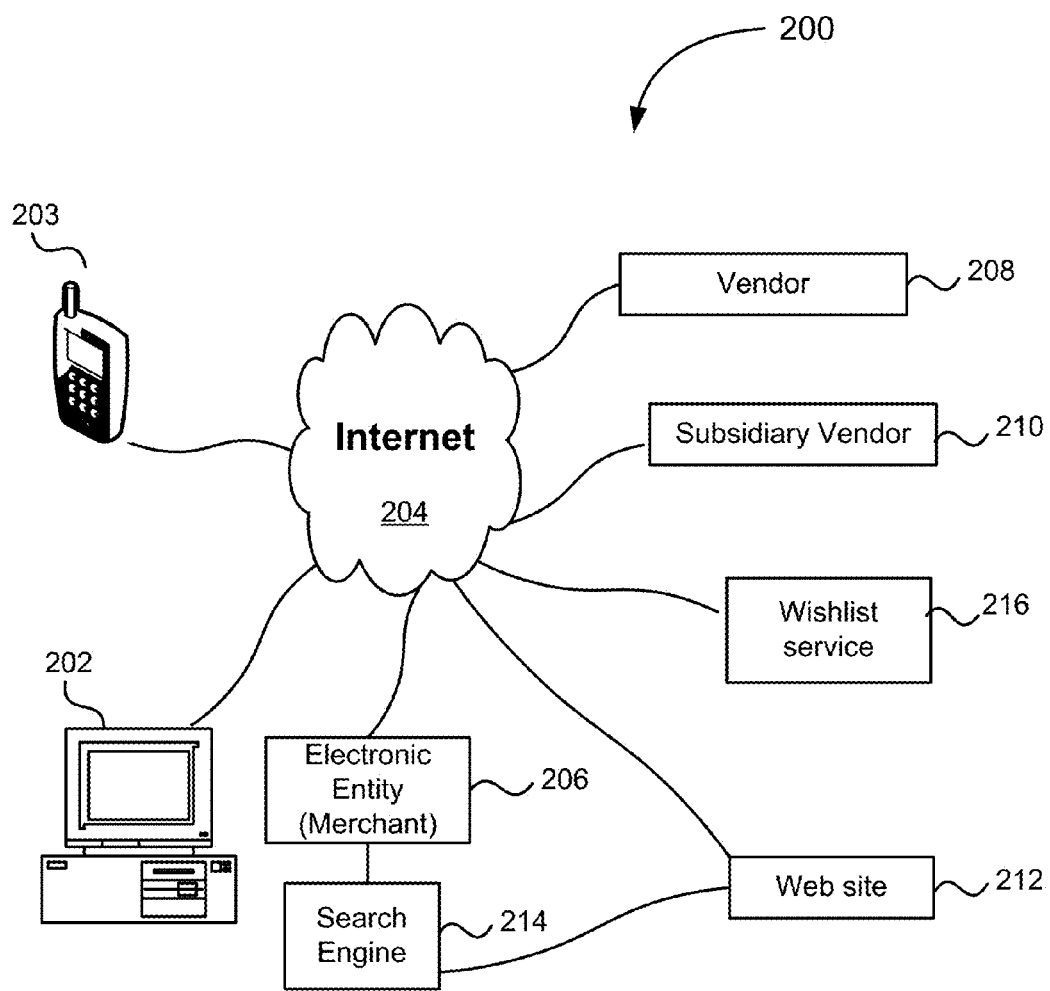
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 and 203 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 and 203 may include personal computers, cell phones, handheld messaging devices, laptop computers, set-top boxes, personal data assistants, electronic book readers, and the like.

In an embodiment, users may interact through devices 202 and 203 with other entities in order to consume content, search for information or items for consumption, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may search, via devices 202 or 203 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption. In short, the merchant 206 may facilitate user search and consumption of items or products offered by the merchant 206 and/or vendors 208 and/or 210, as well as creating wishlists of items by the users of devices 202 or 203.

In an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a brand different from that of the merchant 206. The subsidiary vendor 210 may offer products for consumption that are the same as or different from those offered by the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, shopping for products, and the like. The Web sites 212 may offer other services, such as content or product search services, audio, social networking services, and the like. While the example environment 200 shows Web sites for the purpose of illustration, it should be understood that any type of content may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, viewing content from the entities, consuming items from the entities, creating wishlists, and the like. In order to create wishlists for third parties, users may utilize Wishlist service 216. For example, a user of the device 203 may create a wishlist for a user of the device 202 (third party) using the Wishlist service 216 as briefly described above. Specifically, the user of the device 203 (first party) may have access to the user of the device 202's own wishlist through the Wishlist service 216. The first party user may share the created wishlist with other users, receive updates to the wishlist from other users, conduct search for the items corresponding to the third party's desired items, and the like utilizing the Wishlist service 216. The operation of the Wishlist service 216 will be described in greater detail in reference to FIGS. 3-17.

In order to search for items or other content provided by the entities, the users may utilize a search service, e.g., the Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like.

Figure 3:
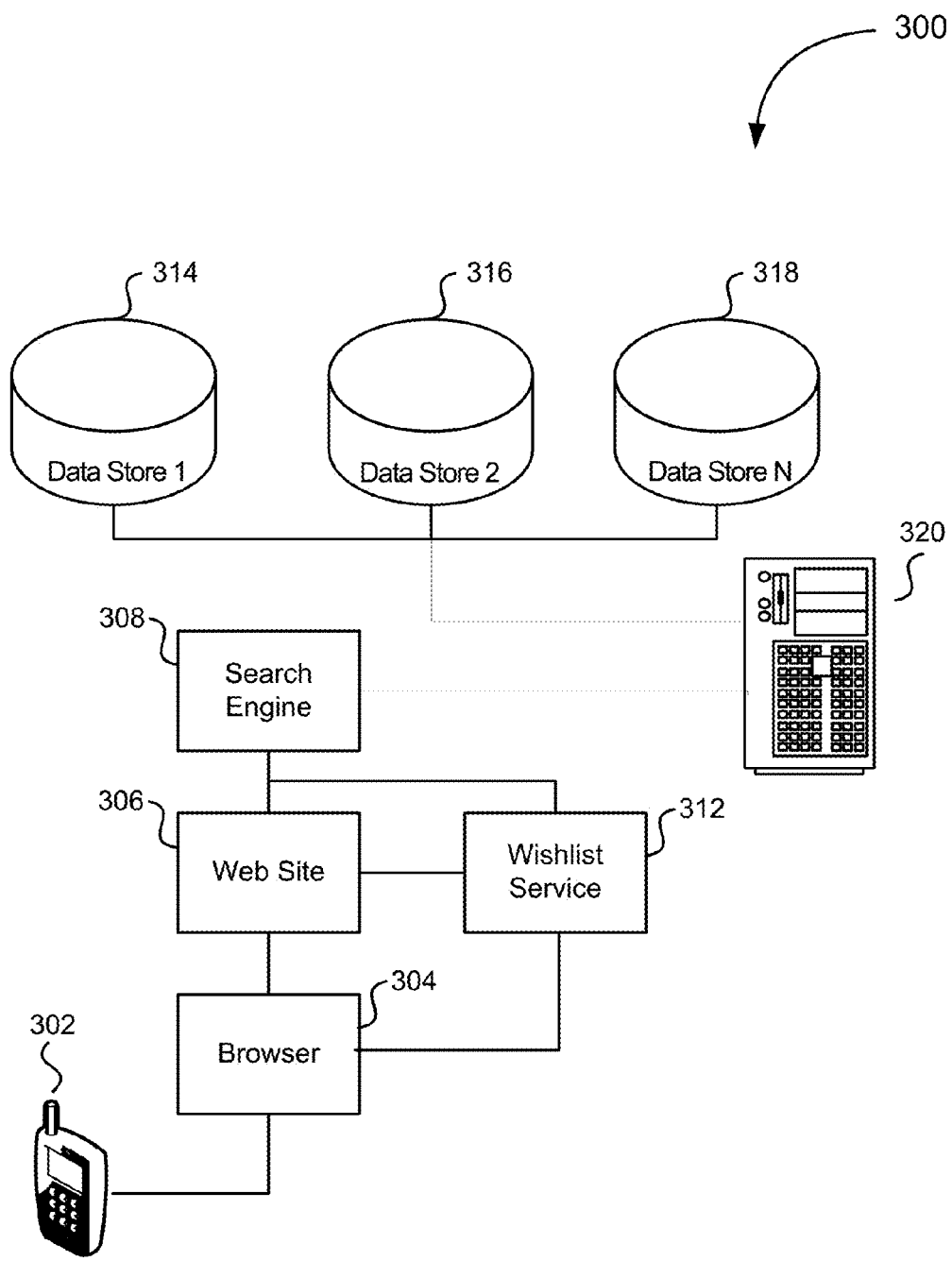
FIG. 3 illustrates a diagrammatic representation of an environment which may incorporate one or more components that are described above in connection with FIGS. 1 and 2 and that may be used in accordance with various embodiments.

FIG. 3 shows an illustrative environment 300 that an electronic entity such as the merchant 206 may utilize in order to provide a user with an ability to create wishlists for third parties and update wishlists created for third parties with product items or other content offered by the merchant 206 and/or vendors 208 and 210 using Wishlist service 216 in accordance with an embodiment. In an embodiment, the environment 300 of FIG. 3 is utilized by an electronic entity (such as the merchant 206 shown in FIG. 2) to provide a user with an ability to create and update wishlists for third parties using a Wishlist service 312 described herein. It is to be understood that the Wishlist service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computing device 302 utilized by a user for interaction with electronic entities that provide content. Content may be accessed by a user operating the device 302 through a browser 304. For example, content may include products or items of various types that are to be placed on a Web site 306. The Web site 306 may utilize a search engine 308 in order to provide a user with the ability to search for products offered by the merchant 206 or other entities. The content may be stored in the remote content data stores 314, 316, and 318 and may be utilized by merchants, Web sites, or other entities in order to provide users an opportunity to search for, and view, items for consumption and/or other content by navigating to a Web site 306 operated by a merchant (e.g., merchant 206 on FIG. 2) through a Web server 320. For example, the data stores may be associated with the server 320 serving the Web site 306 operated by the merchant 206. The data stores may be accessible with the search engine 308 through the Internet or any other type of computer network known in the art. It will be appreciated that the content may be stored in one or more data stores and that three data stores 314, 316, and 318 are shown for purely illustrative purposes, such that the number of data stores is not limited to three or any other number.

In an embodiment, a Wishlist service 312, operating on the device 302, is configured to provide a user with an ability to create wishlists for third parties and update wishlists created for third parties with product items or other content. A wishlist for the third party may include items input by the first party user or other users who may be authorized by the first party user to access the first party's wishlist for the third party. The wishlist for the third party may be updated with the items that the third party included in his/her own wishlist or corresponding items retrieved based on the items included in the third party user's wishlist. The wishlist created for a third party may include alerts regarding significant dates associated with the third party. The wishlist may be collaborative, i.e., a community of users affiliated with the third party may have access to, and be able to update, the wishlist.

In order to create or update a wishlist for a third party, a user of the device 302 may access the Web site 306 containing items, products, or other content as described above. The Web site 306 may be accessible through the Wishlist service 312. The Web site 306 may be displayed on the computing device 302 via the browser 304. A user may conduct a search using search engine 308 in order to search items in one or more data stores 314-318. When a user sends a search request for an item via the search engine 308, the data corresponding to the user's request is assembled and returned to the user via the Web site 306 served by the server 320 and rendered by browser 304 on computing device 302. The user then may update a wishlist created for a third party with the search results returned by the search engine 308.

Figure 4:
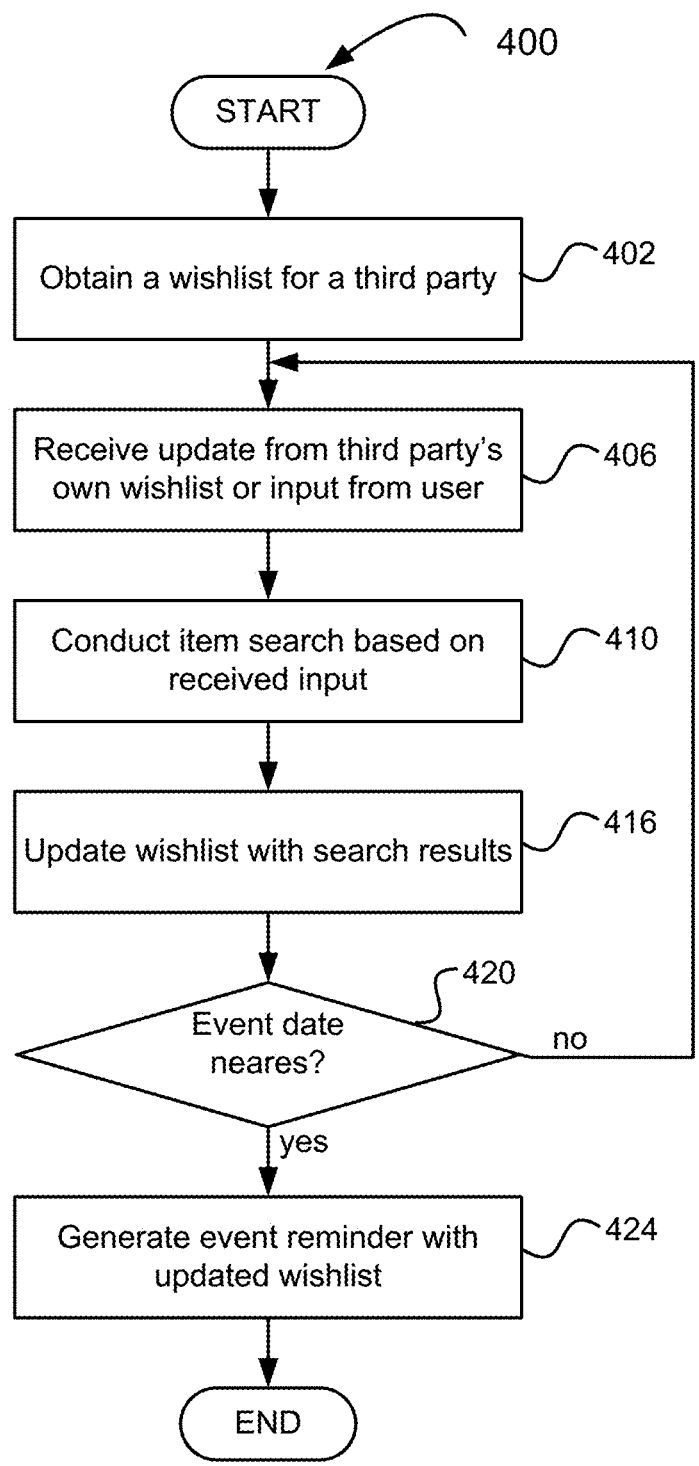
FIG. 4 illustrates a process flow diagram for updating a wishlist created for a third party based on content relevant to the third party in accordance with an embodiment.

FIG. 4 illustrates a process flow diagram for updating a wishlist created for a third party based on content relevant to the third party in accordance with an embodiment. The process 400 starts at block 402, where a wishlist for a third party is obtained. The wishlist may be obtained in a number of different ways. For example, a user of a client device may manually enter a wishlist for a third party using the Wishlist service configured on the client device or on the server serving the client device. The wishlist may be compiled in a number of different ways. For example, the wishlist may include items in which the third party expressed his/her interest to the user creating the wishlist. In one embodiment, the user may use the third party's own wishlist in order to create a wishlist for the third party. The third party's own wishlist information may be fed to the Wishlist service and become available to the user creating the wishlist for the third party. In one embodiment, the third party's own wishlist may automatically become a default wishlist for the third party. The user may take pictures of third party's items of interest or download text related to the third party's items of interest. Subsequent analysis of the image of an item or text related to an item may identify the item using known detection and recognition techniques (described below in greater detail) and the item may be added to wishlist.

At block 406, an update to the wishlist, if any, may be received. As described above, an update may be received in a number of different ways. Generally, an update may be received from a content source that may or may not be associated with a third party. For example, an update may be based on a corresponding update made to the third party's own wishlist. An update may be input by the user (typed in, derived from an image of an item taken by the user, and the like). An update may be based on the third party's own posts on the Internet. For example, an update may be auto-pulled or fed from a Web resource (e.g., a social networking site such as Facebook® or Twitter®) with which the third party may be associated and posts his/her messages. An update may also be posted by a party other than the user. In this case, the party should have appropriate credentials that could be verified in order to provide access to the wishlist. It is important to note that block 406 is optional to the process 400 as will be described below.

At determination block 410 it is determined whether an event date, e.g., a significant date associated with the third party, is nearing. A significant date may be any date related to the third party's personal life (e.g., birthday, wedding anniversary and the like). The significant date may also be any date related to a religious, cultural, or any other holiday, such as Christmas, Hanukkah, New Year, Valentine's Day and the like. If the event date is determined to be beyond the predetermined time period, the process returns to block 406. If the event date is determined to be closer than the predetermined time period, the wishlist update is triggered at block 416.

In one embodiment, the predetermined time period may be zero, i.e., a determination may be made as to whether an event date falls on today's date. In that case, the Wishlist service may update the wishlist, for example, based on items contained in the wishlist or most recent item updates received at block 406. In one embodiment, no item updates may have been received at block 406 by the event date. In this case, a search may be conducted in order to update item information in the wishlist. For example, if item information in the wishlist is "stale" and has not been updated for a lengthy time period, e.g., a few months, an update of the wishlist by the event date is desirable as the list may be used to purchase an item of interest for the third party.

Accordingly, at block 416 an item search triggered by the nearing event date and based on input received at block 406 or on the item information contained in the wishlist is conducted. The search may be conducted on a Web site offering various types of content for purchase, such as news, video, shopping for products, and the like, as described above in reference to FIG. 2. The search may be based on search terms derived, for example, from the item information contained in the wishlist. In another embodiment, the search may be based on search terms derived from information about the item added to the third party's own wishlist. Search terms may be extracted from information about the item after an item has been identified based on an image of the item taken by the user. Search terms may also be extracted from the text containing item description and placed on the Web site offering this particular item. Search terms may also be extracted from the third-party postings on associated Web resources (e.g., Facebook®) and fed into the Wishlist service as described above. Alternatively, the user may enter his/her own search terms in order to conduct the search.

At block 420, a wishlist is updated with the results of the search conducted at block 416. The user may select the search results manually and update the wishlist. In an embodiment, the wishlist may be updated with a subset of the search results (e.g., with one or more of the highest ranking results) automatically. The updated wishlist may then be displayed to the user along with the significant date alert at block 424. The process 400 then ends.

In an embodiment, the wishlist update may be triggered by updates to the wishlist described above in reference to block 406. In this case, the nearing of the event date may trigger further search and the wishlist update described above in relation to the blocks 416 and 420. The updated wishlist may be displayed to the user along with the significant date alert at block 424.

Figure 5:
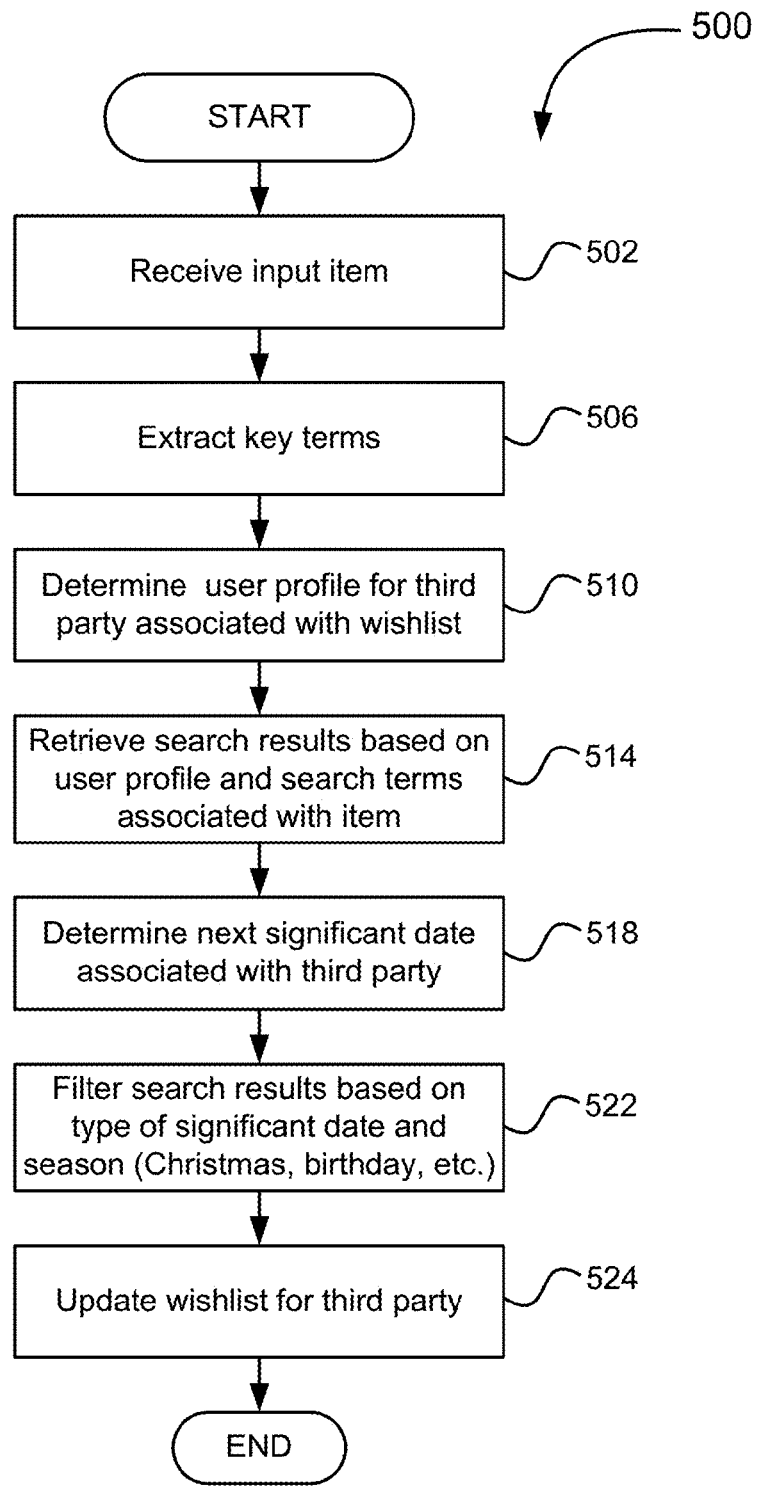
FIG. 5 illustrates a process flow diagram for updating a wishlist created for a third party based on content relevant to the third party in accordance with another embodiment.

FIG. 5 illustrates a process flow diagram for updating a wishlist for a third party in accordance with an embodiment. The process 500 begins at block 502, when an input containing a description of an item or a keyword related to an item or defining an item is received. At block 506, search terms associated with an item are extracted from information for the item as described in reference to FIG. 4. At block 510 a user profile for a third party associated with a wishlist is determined. The user profile may be pulled from a Web resource associated with the third party (e.g., Facebook®, Amazon.com®, and the like). The user profile may be also derived from the third party's self-described profile derived from information associated with the third party, for example audio or video files related to the third party.

The user profile may help filter items returned with search results based on the extracted terms. In an embodiment, a gender, age, profession, hobby, or other preferences of the third party may be determined from the third party profile. For example, the third party may have particular shopping preferences based on his/her profession: a builder might have special preferences for tools, while a historian may have preferences for history books. At block 514 the search results are retrieved and filtered based on the determined user profile.

At block 518 the next significant date associated with a third party is determined. At block 522 the search results are further filtered based on the type of significant date (e.g., different items may be selected for the third party's wedding anniversary or third party's birthday). The results may be further filtered based on a season to which the date belongs. For example, winter clothes may be selected among the search results if a significant date falls on winter (e.g., Christmas), while summer outfits may be selected if the significant date falls on summer (e.g., Mother's Day). At block 524 a wishlist for the third party is updated with the filtered search results. The process 500 then ends. It will be appreciated that blocks 514-522 may be executed in a different sequence. For example, the search results may be retrieved first and then filtered based on the third party's profile and/or type of a significant date.

Figure 6:
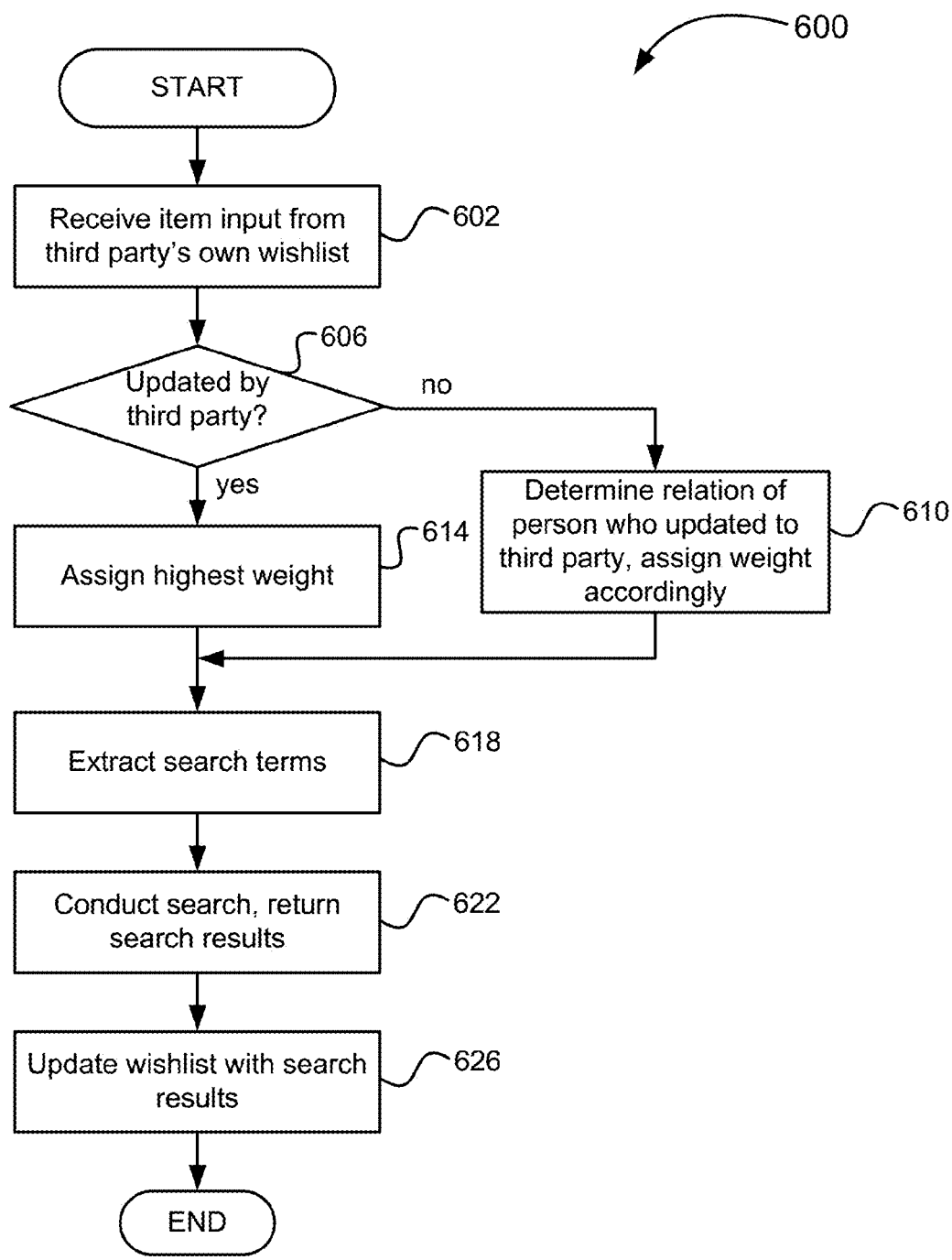
FIG. 6 illustrates a process flow diagram for updating a wishlist created for a third party based on content relevant to the third party in accordance with yet another embodiment.

FIG. 6 illustrates a process flow diagram for updating a wishlist for a third party in accordance with an embodiment. The process 600 begins at block 602, where an input associated with a desired item information is received, for example, from the third party's own wishlist. At determination block 606, it is determined whether the third party's own wishlist was updated by the third party. If it is determined that the third party's own wishlist was updated by anybody other than the third party, the relation between the person who updated the third party's wishlist and the third party is determined and a weight to the update is assigned accordingly at block 610. For example, if it is determined that the third party's spouse updated the wishlist, the assigned update weight may be higher than that of the update provided by the third party's third cousin twice removed. If the third party's own wishlist is updated by the third party at block 614, information associated with the item is assigned the highest weight. A placement of the item on the wishlist (e.g., prominence of the item on the list) may be assigned according to the assigned weight. For example, an item with the highest assigned weight may be placed at a first position on the wishlist.

Blocks 618-626 may be executed as necessary; for example, if the item update is "stale", e.g., an update of the third party's own wishlist with the item occurred at a time period exceeding a predetermined value (e.g., one month), a newer version of the item may be searched for on the Web site as described above. Accordingly, at block 618, the search terms may be extracted from the item information. At block 622, the search results may be returned that are associated with the extracted key terms. Finally, at block 626, the wishlist is updated with the search results as discussed above.

Figure 7:
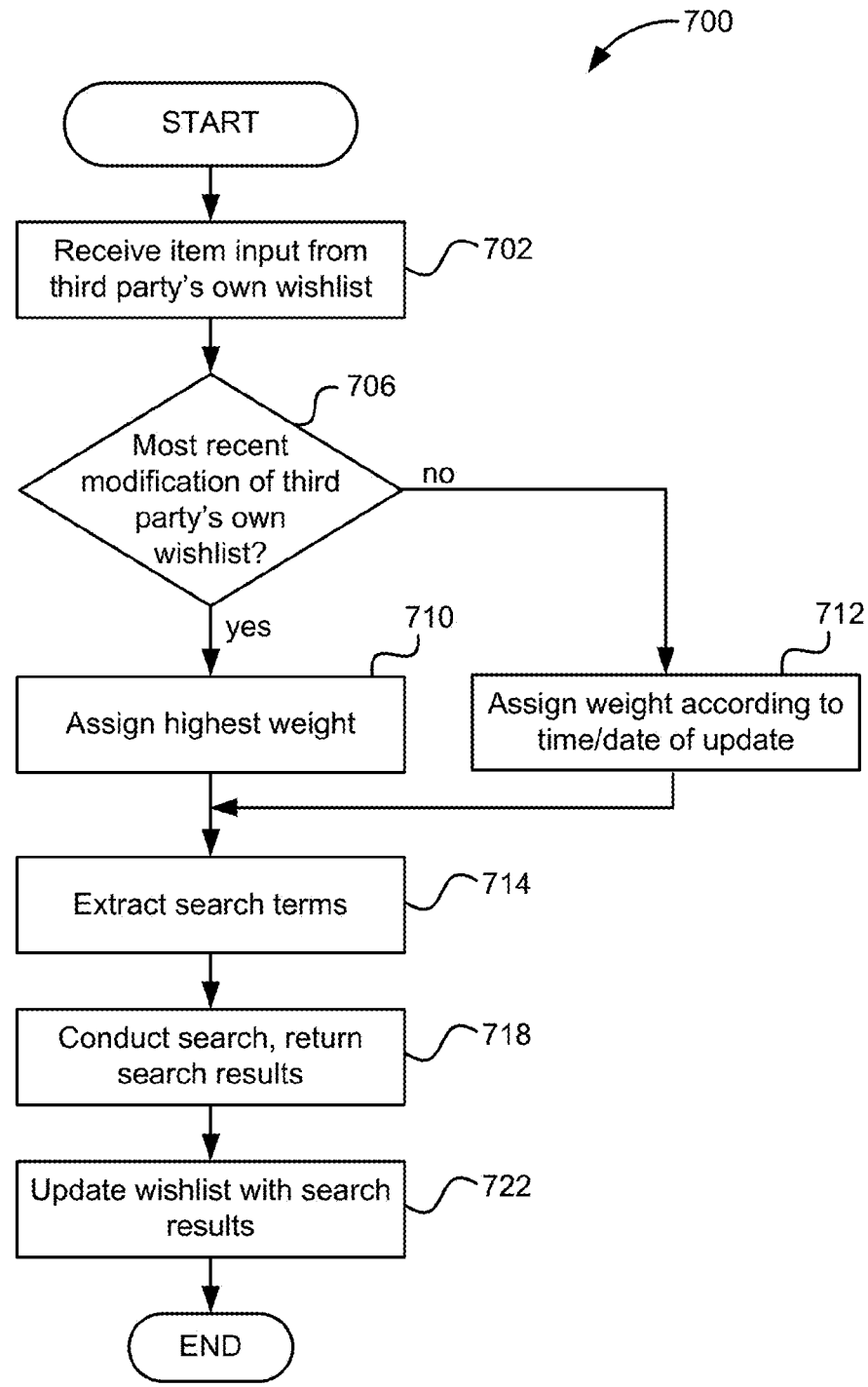
FIG. 7 illustrates a process flow diagram for updating a wishlist created for a third party based on content relevant to the third party in accordance with yet another embodiment.

FIG. 7 illustrates a process flow diagram for updating a wishlist for the third party in accordance with yet another embodiment. The process 700 begins at block 702, where an input for information associated with an item is received from the third party's own wishlist. At determination block 706, it is determined whether the input from the third party's own wishlist is associated with the most recent modification of the third party's own wishlist. If the received input is related to the most recent modification of the third party's own wishlist, at block 710 the information associated with the update is assigned the highest weight.

For example, updates of the third party's own wishlist that are fed into the Wishlist service in order to update a wishlist for a third party created by the user may be ranked according to their date/time of appearance in the third party's own wishlist, e.g., the latest update that appeared today may be assigned a weight that is higher than an update that appeared a day prior to the latest update. If the modification is not the most recent, the process moves to block 712, where the update is assigned weight according to a recency of its appearance relative to other updates. Blocks 714 may be performed as necessary, as discussed above in reference to FIG. 6. At block 714, the search terms are extracted from information associated with an item. At block 718 the search is conducted based on the extracted key terms and search results are returned. Finally, at block 722 the wishlist is updated with the search results. The process 700 then ends.

Figure 8:
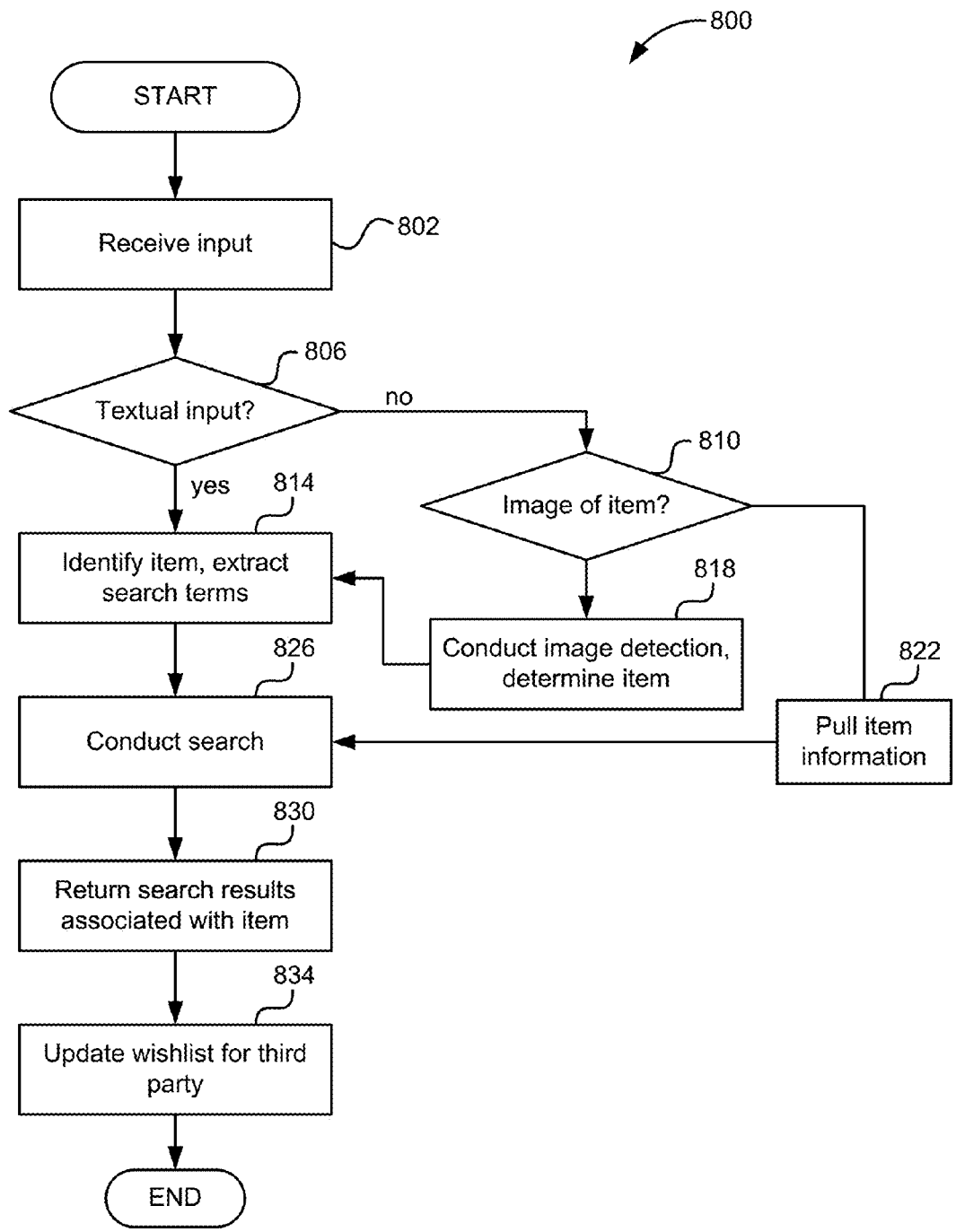
FIG. 8 illustrates a process flow diagram for updating a wishlist created for a third party based on content relevant to the third party in accordance with yet another embodiment.

FIG. 8 illustrates a process flow diagram for updating a wishlist for a third party depending on the type of input in accordance with an embodiment. The process 800 begins at block 802, where the input associated with item information is received. At determination block 806, it is determined whether the input is textual. If the input is not textual, at determination block 810, it is determined whether an image of an item is received. If the image of an item is received, at block 818 an image detection is conducted and an item is identified. Image recognition and detection may be carried out according to known techniques, for example, the features of the item may be determined using homography; interest points of the image may be identified by using, for example, an interest point detection algorithm such as Harris Interest Points detection algorithm, Moravec corner detection algorithm, or the like. As another example, if an image contains a barcode of the item, the barcode may be decoded using a barcode decoding technique and then the barcode validity may be confirmed per UPC-A, UPC-E or other known barcode standards. Based on the above determination, an item may be identified at block 814.

If the input is textual, the item may be identified using known text recognition techniques at block 814. If the received input is not an image of an item, at block 822 it is determined that the input is associated with a different type of input, for example, withdrawal of information from a social networking site associated with the latest post by a third party, withdrawal of information derived from geolocation tagging associated with the third party, and the like. The process then moves to block 814, when the item is identified based on the pulled information as described above. Blocks 826-830 may be performed as necessary. At block 826 a search associated with the received item is conducted. At block 830, the search results associated with the item are returned. At block 832, the wishlist for a third party is updated. The process 800 then ends.

Figure 9:
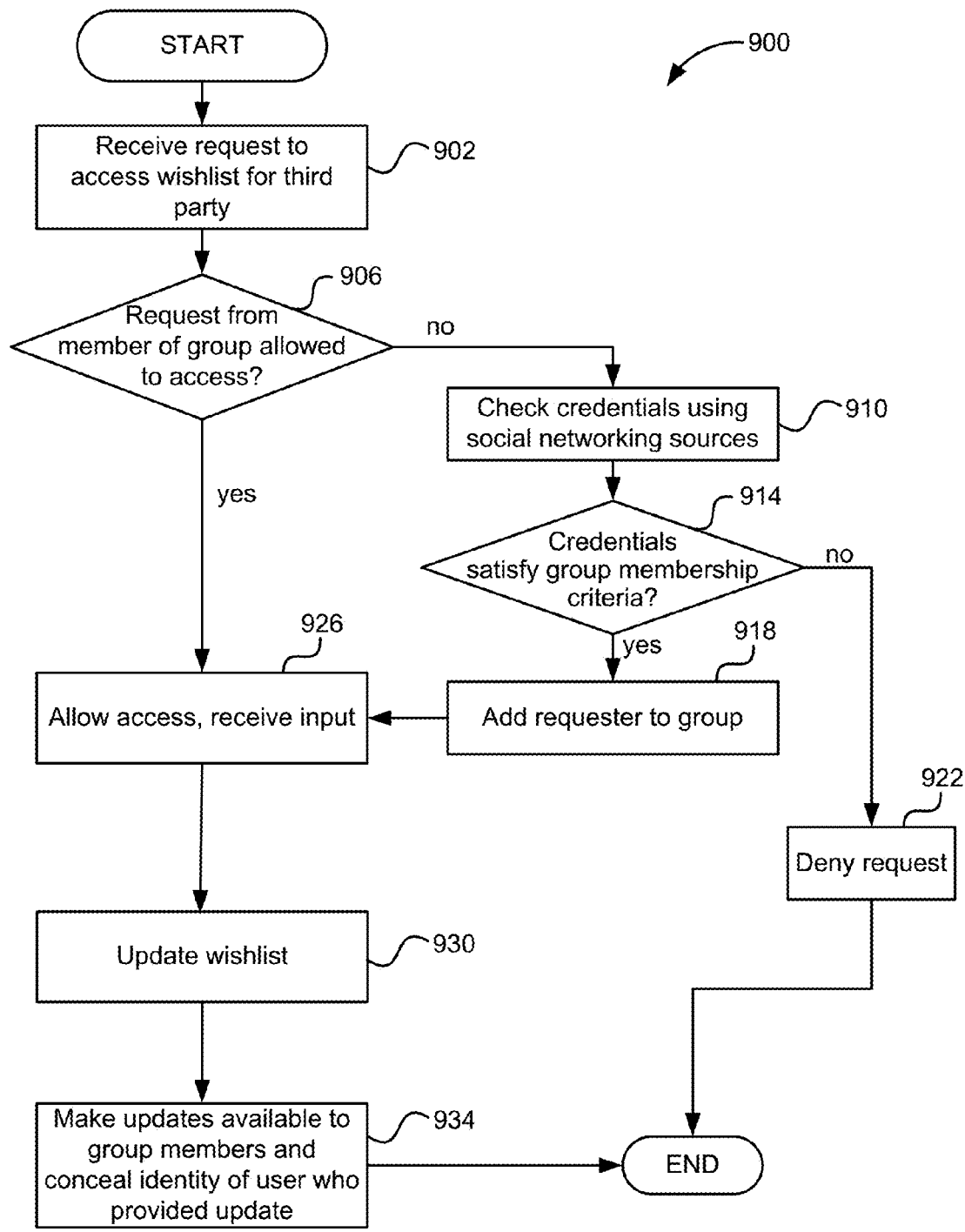
FIG. 9 illustrates a process flow diagram for updating a wishlist created for a third party based on content relevant to the third party in accordance with yet another embodiment.

FIG. 9 illustrates a process flow diagram for determining a group of users who are allowed to access a wishlist for a third party in accordance with an embodiment. The process 900 begins at block 902 where the request to access a wishlist for a third party is received. At determination block 906 it is determined whether a request is received from a member of a group allowed to access the wishlist. If the request is received from a non-member, at block 910 the credentials of a user submitting the request are checked, for example, using available social networking sources such as Facebook®.

As discussed above, a group of individuals who may be allowed to access a wishlist may be selected according to the predetermined criteria. In one embodiment, the creator of a wishlist may set up these criteria, for example, an affinity or relation of a user requesting to access a wishlist to the third party (e.g., a relative, a friend, a co-worker, a member of the organization of which the third party is also a member, a social network community of the third party, and the like). In an embodiment, the credentials of the requestor may be checked automatically using, for example, requestor's personal information published in a social networking site, such as Facebook®. In another embodiment, a requestor, for example, a vendor or an advertiser wishing to offer products, services, or advertisements of products or services may be requested by the creator of the wishlist to pay a certain fee in order to be allowed to access the wishlist and place his information on the wishlist.

At block 914 it is determined whether the credentials satisfy group membership criteria. If the credentials do not satisfy the membership criteria, at block 922 the access request is denied and the process ends. If the credentials satisfy the group membership criteria, at block 918 the requester is added to the group. At block 926 access to requester is allowed and the input from the requester is received. At block 930, a wishlist is updated based on the input associated with the access. At block 934 updates to the wishlist are made available to group members; at the same time identity of user who provided an update is concealed. The process 900 then ends.

FIGS. 10-17 illustrate example screenshots of a user interface of a system for providing event reminders configured on a wireless device (e.g., iPhone). The screens illustrated in FIGS. 10-17 should be interpreted as in no way limiting and are shown for illustrative purposes only. FIG. 10 illustrates a wireless device display screen 1000 showing a plurality of wishlists 1002-1008 for third parties (Jada, Evan, Hannah, and Molly) compiled by the user of the wireless device in accordance with an embodiment. It will be appreciated that any number of wishlists may be included in the screen 1000. In one embodiment, an icon 1010 "+" is displayed that is configured to allow the user to add more wishlists if desired. Alternatively or in addition, the screen may contain an instruction, e.g., "find friends" if no wishlist for a friend (third party) has been added. An alert area 1012 may contain an alert message alerting the user to a nearing significant date (e.g., Valentine's day).

FIG. 11 illustrates a wireless device display screen 1100 showing a page associated with the wishlist for a third party (Evan) in accordance with an embodiment. The screen 1100 includes a "quick entry" field 1102 that enables a user to enter an item name or a search term manually (e.g., "Transformers") using a keyboard 1104. A search based on the entered item or search term may be performed as described above in reference to FIGS. 4-9.

FIG. 12 illustrates a wireless device display screen 1200 showing details of the wishlist for a third party (Evan) in accordance with an embodiment. The screen 1200 includes personal data of a third party 1202. The personal data may include an alert message alerting the user to a nearing significant date for a third party (e.g., Evan's birthday). The wishlist may show search results 1204 obtained as described above. The search results may include information related to each result, in one embodiment shown as a thumbnail. The third party's own wishlist 1206 may also be shown.

FIG. 13 illustrates a wireless device display screen 1300 showing search results for the wishlist for a third party (Evan) in accordance with an embodiment. The screen 1300 includes search results 1302-1310 returned in response to a "quick entry" described in reference to FIG. 11.

FIG. 14 illustrates a wireless device display screen 1400 showing details of a search result 1310 in accordance with an embodiment. The screen 1400 includes product details 1402 associated with the item 1310 "Transformers Action Figure Optimus Prime" when selected by the user. It is to be understood that the product details 1402 are shown for merely illustrative purposes; a variety of product detail layouts may be utilized for the screen 1400.

FIG. 15 illustrates a wireless device display screen 1500 showing a different product detail layout 1502 in accordance with an embodiment. The layout 1502 includes an option 1504 "add to wishlist" or "buy now" the item 1310.

Figures 16, 17:
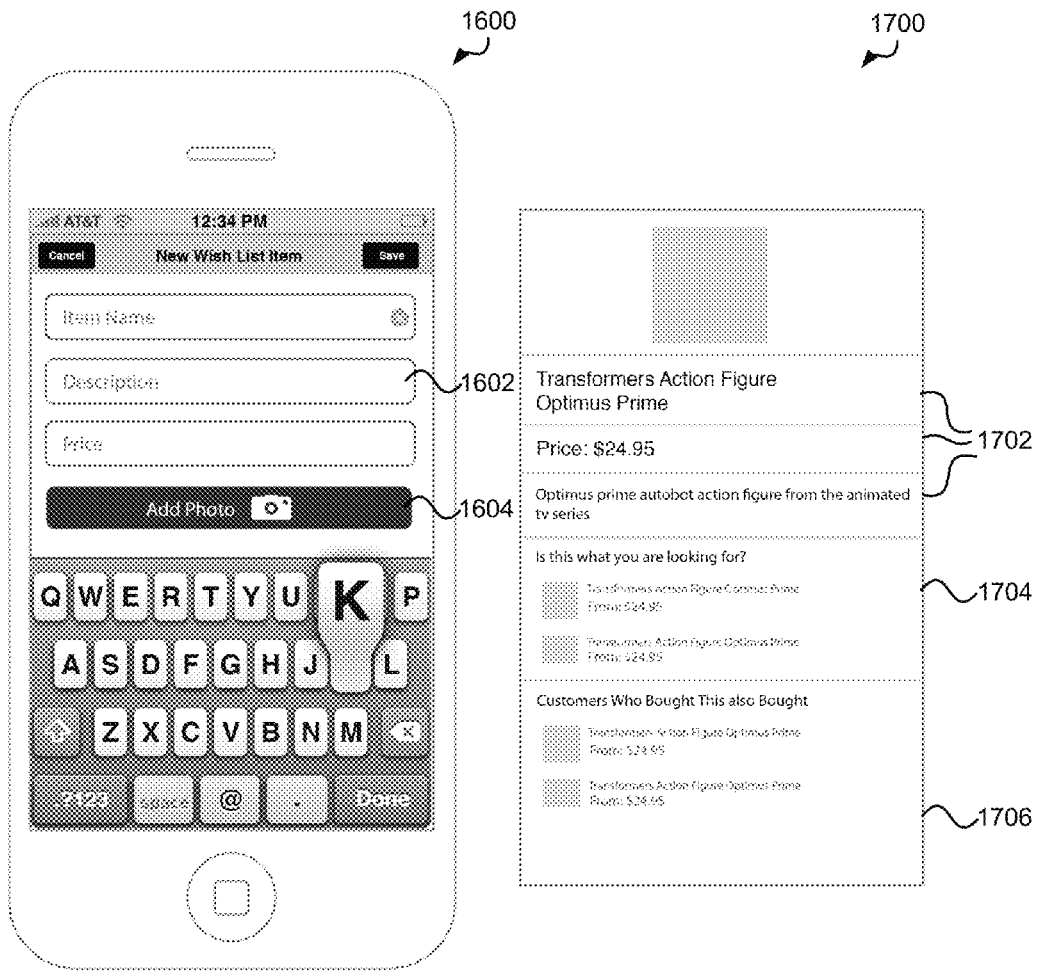
FIG. 16 illustrates yet another example screenshot of a user interface of a system for providing event reminders configured on a wireless device in accordance with an embodiment.
FIG. 17 illustrates yet another example screenshot of a user interface of a system for providing event reminders configured on a wireless device in accordance with an embodiment.

FIG. 16 illustrates a wireless device display screen 1600 configured to receive user entry of an item for the wishlist for a third party in accordance with an embodiment. The screen 1600 may be different from the one including a "quick entry" capability and described above in reference to FIG. 11. The screen 1600 includes item details windows 1602 into which a user may enter an item name (e.g., "Transformers") and/or an associated description and/or price that may be used for a subsequent search for the item as described above. The screen 1600 further includes an image capture element (e.g., a camera) 1604 with which a user may capture an image of an item. The captured image may be analyzed as discussed above and information derived from that analysis may also be utilized to conduct a search for the item.

FIG. 17 illustrates a wireless device display screen 1700 showing search results of the search for an item entered manually as described above in reference to FIG. 16. The screen 1700 includes item information 1702 entered by the user as described above in reference to FIG. 16. The screen 1700 further includes search results 1704 returned in response to the entry of the item information. The screen 1700 may also include other elements, for example, one or more items 1706 related to the entered item ("Transformers Action Figure Optimus Prime") as shown under the title "Customers Who Bought This Also Bought . . . ."

As discussed above, the various embodiments can be implemented in a wide variety of operating environments which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker).

Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for updating a wishlist created for a third party user, comprising:
   receiving, by at least one web server, a request to access a wishlist for a third party user, the wishlist including a wishlist service of an electronic marketplace being operated by the at least one web server, and the wishlist including one or more items;
   determining, by the at least one web server, that a requestor submitting the request is a member of a user group that is allowed to access the wishlist, the determining being based on information associated with the requestor and retrieved from content submitted by the requestor to a web-based networking resource, the determining including establishing that a relationship of the requestor to the third party user satisfies predetermined relationship criteria;
   updating, by the at least one web server, the wishlist to include an item included in the request based on the determination that requestor is a member of the user group; and
   providing, by the at least one web server, the updated wishlist to be viewable to other members of the user group, wherein an identity of the requestor submitting the request is not available to the other members of the user group.

2. The computer-implemented method of claim 1, wherein establishing that the relationship of the requestor to the third party user satisfies predetermined relationship criteria includes determining from the content on the web-based networking resource whether the requester is identified as one of a relative, a friend, a co-worker, or a member of an organization of which the third party user is also a member.

3. The computer-implemented method of claim 1, wherein the predetermined relationship criteria are set up by a user who created the wishlist for the third party user.

4. The computer-implemented method of claim 1, further comprising:
   determining that a significant date associated with the third party user is ahead of a current date by a predetermined time period; and
   rendering an alert message including information associated with the determined significant date and the updated wishlist to a client computing device.

5. The computer-implemented method of claim 1, further comprising:
   assigning a weight to the item included in the request; and
   placing the item in the wishlist according to the relationship of the requestor to the third party user.

6. The computer-implemented method of claim 1, wherein if it is determined that the requestor submitting the request is not a member of the user group, further comprising:
   checking credentials of the requestor submitting the request using available social networking sources.

7. The computer-implemented method of claim 1, further comprising:
   receiving a fee from the requestor in order for the requestor to be allowed to access the wishlist.

8. A computer system for updating a wishlist created for a third party user, the computer system comprising:
   a processor; and
   a memory having computer-executable instructions that, when executed on the processor, cause the processor to:
   receive a request to access a wishlist for a third party user, the wishlist including a wishlist service of an electronic marketplace being operated by the processor, and the wishlist including one or more items;
   determine that a requestor submitting the request is a member of a user group that is allowed to access the wishlist, the determining being based on information associated with the requestor and retrieved from content submitted by the requestor to a web-based networking resource, the determining including establishing that a relationship of the requestor to the third party user satisfies predetermined relationship criteria;
   update the wishlist to include an item included in the request based on the determination that requestor is a member of the user group; and
   provide the updated wishlist to be viewable to other members of the user group, wherein an identity of the requestor submitting the request is not available to the other members of the user group.

9. The computer system of claim 8, wherein establishing that the relationship of the requestor to the third party user satisfies predetermined relationship criteria further causes the processor to determine from the content on the web-based networking resource whether the requester is identified as one of a relative, a friend, a co-worker, or a member of an organization of which the third party user is also a member.

10. The computer system of claim 8, wherein the predetermined relationship criteria are set up by a user who created the wishlist for the third party user.

11. The computer system of claim 8, wherein the computer-executable instructions further cause the processor to:
   determine that a significant date associated with the third party user is ahead of a current date by a predetermined time period; and
   render an alert message including information associated with the determined significant date and the updated wishlist to a client computing device.

12. The computer system of claim 8, wherein the computer-executable instructions further cause the processor to:
   assign a weight to the item included in the request; and
   place the item in the wishlist according to the relationship of the requestor to the third party user.

13. The computer system of claim 8, wherein if it is determined that the requestor submitting the request is not a member of the user group, the computer-executable instructions further cause the processor to:
   check credentials of the requestor submitting the request using available social networking sources.

14. The computer system of claim 8, the computer-executable instructions further causing the processor to:
   receive a fee from the requestor in order for the requestor to be allowed to access the wishlist.

15. A non-transitory computer-readable storage medium having computer-executable instructions for updating content created for a third party user stored thereon that, when executed by a computer, cause the computer to:
   receive a request to access a wishlist for a third party user, the wishlist including a wishlist service of an electronic marketplace being operated by the computer, and the wishlist including one or more items;
   determine that a requestor submitting the request is a member of a user group that is allowed to access the wishlist, the determining being based on information associated with the requestor and retrieved from content submitted by the requestor to a web-based networking resource, the determining including establishing that a relationship of the requestor to the third party user satisfies predetermined relationship criteria;
   update the wishlist to include an item included in the request based on the determination that requestor is a member of the user group; and
   provide the updated wishlist to be viewable to other members of the user group, wherein an identity of the requestor submitting the request is not available to the other members of the user group.

16. The non-transitory computer-readable storage medium of claim 15, wherein establishing that the relationship of the requestor to the third party user satisfies predetermined relationship criteria further causes the computer to determine from the content on the web-based networking resource whether the requester is identified as one of a relative, a friend, a co-worker, or a member of an organization of which the third party user is also a member.

17. The non-transitory computer-readable storage medium of claim 15, wherein the predetermined relationship criteria are set up by a user who created the wishlist for the third party user.

18. The non-transitory computer-readable storage medium of claim 15, wherein the computer-executable instructions further cause the computer to:
   determine that a significant date associated with the third party user is ahead of a current date by a predetermined time period; and
   render an alert message including information associated with the determined significant date and the updated wishlist to a client computing device.

19. The non-transitory computer-readable storage medium of claim 15, wherein the computer-executable instructions further cause the computer to:
   assign a weight to the item included in the request; and
   place the item in the wishlist according to the relationship of the requestor to the third party user.

20. The non-transitory computer-readable storage medium of claim 15, wherein the computer-executable instructions further cause the computer to:
   check credentials of the requestor submitting the request using available social networking source.

\* \* \* \* \*